(12) United States Patent
Cho et al.

(10) Patent No.: US 8,718,132 B2
(45) Date of Patent: *May 6, 2014

(54) VIDEO ENCODING APPARATUS, VIDEO DECODING APPARATUS, AND METHOD

(75) Inventors: Dae-sung Cho, Seoul (KR); Woong-il Choi, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 52 days.

This patent is subject to a terminal disclaimer.

(21) Appl. No.: 13/463,285

(22) Filed: May 3, 2012

(65) Prior Publication Data

US 2012/0219061 A1 Aug. 30, 2012

Related U.S. Application Data

(63) Continuation of application No. 12/289,213, filed on Oct. 22, 2008, now Pat. No. 8,194,733.

(30) Foreign Application Priority Data

Mar. 10, 2008 (KR) ........................ 10-2008-0022157

(51) Int. Cl.
*H04N 11/02* (2006.01)
(52) U.S. Cl.
USPC ................................ 375/240.01; 375/240.12
(58) Field of Classification Search
None
See application file for complete search history.

(56) References Cited

U.S. PATENT DOCUMENTS

| | | | |
|---|---|---|---|
| 6,292,512 B1 | 9/2001 | Radha et al. | |
| 6,873,655 B2 | 3/2005 | Comer et al. | |
| 7,912,124 B2 | 3/2011 | Comer et al. | |
| 7,970,057 B2 | 6/2011 | Park et al. | |
| 8,036,276 B2 | 10/2011 | Park et al. | |
| 2004/0022318 A1 | 2/2004 | Garrido et al. | |
| 2005/0259729 A1 | 11/2005 | Sun | |
| 2007/0086666 A1 | 4/2007 | Bruls | |
| 2007/0160153 A1 | 7/2007 | Sullivan | |
| 2007/0171971 A1 | 7/2007 | Francois et al. | |
| 2009/0110054 A1 | 4/2009 | Kim et al. | |

OTHER PUBLICATIONS

Wu, D., *Scalable Video Coding and Transport over Broad-Band Wireless Networks*, Proceedings of the IEEE, vol. 89, No. 1, Jan. 2001, pp. 6-20.

Li, W., *Overview of Fine Granularity Scalability in MPEG-4 Video Standard*, IEEE Transactions on Circuits and Systems for Video Technology, vol. 11, No. 3, Mar. 2001, pp. 301-317.

(Continued)

*Primary Examiner* — Minh Dinh
(74) *Attorney, Agent, or Firm* — Staas & Halsey LLP

(57) ABSTRACT

Provided are a scalable video encoding apparatus, a scalable video decoding apparatus, and method. The scalable video encoding apparatus includes a first encoding unit to generate a base layer bitstream, which is to be used for generating a reconstructed image having a second resolution, by encoding an original image having a first resolution into an encoded image having the second resolution, and a second encoding unit to generate an enhancement layer bitstream by reconstructing the reconstructed image having the second resolution, which is received from the first encoding unit, to be a reconstructed image having the first resolution in response to an interpolation mode signal, and then to encode the original image having the first resolution by using the reconstructed image having the first resolution, where the enhancement layer bitstream contains additional information for generating a reconstructed image having the first resolution or a third resolution.

25 Claims, 15 Drawing Sheets

(56) References Cited

OTHER PUBLICATIONS

Schwarz, H. et al., *Overview of the Scalable Video Coding Extension of the H.264/AVC Standard,* IEEE Transactions on Circuits and Systems for Video Technology, vol. 17, No. 9, Sep. 2007, pp. 1103-1120.
Winken, M. et al., Bit-Depth Scalable Video Coding, IEEE 2007, pp. 5-8.
International Search Report and Written Opinion, mailed Aug. 28, 2009, in corresponding International Application No. PCT/KR2009/001176 (22 pp.).
Notice of Allowance, mailed Feb. 3, 2012, in corresponding U.S. Appl. No. 12/289,213 (10 pp.).
Korean Office Action issued in corresponding Korean Application No. 10- 2008-0022157; issued Feb. 14, 2014.

☐ LUMINANCE PIXEL
◯ CHROMINANCE PIXEL

4:2:0　　　4:2:0　　　　4:2:2
EVEN FIELD　ODD FIELD　　EVEN FIELD

VIDEO ENCODING APPARATUS, VIDEO DECODING APPARATUS, AND METHOD

CROSS-REFERENCE TO RELATED APPLICATIONS

This application is a continuation of U.S. application Ser. No. 12/289,213, filed Oct. 22, 2008, now U.S. Pat. No. 8,194,733 and claims the benefit of Korean Patent Application No. 10-2008-0022157, filed on Mar. 10, 2008, in the Korean Intellectual Property Office, the disclosures of which are incorporated herein in their entirety by reference.

BACKGROUND

1. Field

One or more embodiments of the present invention relate to video encoding and decoding, and more particularly, to a scalable video encoding/decoding apparatus and method for generating or decoding a bitstream capable of providing various resolutions.

2. Description of the Related Art

A scalable video coding technique, which has been introduced to extend the resolution of the existing encoders, is designed to be not only serviced in even the existing video codecs placed on the market but also to improve image quality in new extended video codecs.

A moving picture capturing method may be categorized into a progressive scanning method and an interlaced scanning method. There is a need to improve the encoding efficiency and the quality of a reconstructed image at an upper layer by adaptively performing scalable video encoding to the moving picture capturing method.

SUMMARY

One or more embodiments of the present invention may include a scalable video encoding apparatus capable of encoding an original image having a first resolution into a reconstructed image having a second resolution at a base layer, and reconstructing the reconstructed image having the second resolution to be a reconstructed image having the first resolution in response to an interpolation mode signal and encoding the original image having the first resolution by using the reconstructed image having the first resolution at an enhancement layer; and a scalable video decoding apparatus.

Additional aspects and/or advantages will be set forth in part in the description which follows and, in part, will be apparent from the description, or may be learned by practice of the invention.

To achieve the above and/or other aspects and advantages, one or more embodiments of the present invention may include a scalable video encoding apparatus including a first encoding unit to generate a base layer bitstream, and to generate a reconstructed image having a second resolution, by encoding an original image having a first resolution into an encoded image having the second resolution, and a second encoding unit to generate an enhancement layer bitstream by reconstructing the reconstructed image having the second resolution, which is received from the first encoding unit, to be a reconstructed image having the first resolution in response to an interpolation mode signal, and then to encode the original image having the first resolution by using the reconstructed image having the first resolution, where the enhancement layer bitstream contains additional information for generating a reconstructed image having the first resolution or a third resolution.

The interpolation mode signal may be determined by considering at least one of a picture type of the original image corresponding to a method used to scan the original image, and a picture type of a reconstructed image at an enhancement layer.

The second encoding unit may include a resolution adjustment unit to generate the reconstructed image having the first resolution by extending bit depths of luminance and chrominance components of the reconstructed image having the second resolution while interpolating the chrominance components, in response to the interpolation mode signal, a subtraction unit to obtain residue data having the first resolution by subtracting the reconstructed image having the first resolution from the original image having the first resolution, a clipping unit to obtain residue data having the third resolution by clipping the residue data having the first resolution, a prediction encoding unit to perform prediction encoding on the residue data having the third resolution, and a bitstream construction unit to generate the enhancement layer bitstream including the encoded residue data having the third resolution and the interpolation mode signal.

The second encoding unit may include a resolution adjustment unit to generate the reconstructed image having the first resolution by interpolating a color component of the reconstructed image having the second resolution, in response to the interpolation mode signal, a subtraction unit to obtain residue data having the first resolution by subtracting the reconstructed image having the first resolution from the original image having the first resolution, a prediction encoding unit to perform prediction encoding on the residue data having the first resolution, and a bitstream construction unit to generate the enhancement layer bitstream including the encoded residue data having the first resolution and the interpolation mode signal.

To achieve the above and/or other aspects and advantages, one or more embodiments of the present invention may include an enhancement layer encoding apparatus including a resolution adjustment unit to generate a reconstructed image having a first resolution by extending bit depths of luminance and chrominance components of a reconstructed image having a second resolution while interpolating the chrominance components in response to an interpolation mode signal, where the reconstructed image having the second resolution is obtained by encoding an original image having the first resolution into a reconstructed image having the second resolution and then decoding the reconstructed image having the second resolution, a subtraction unit to obtain residue data having the first resolution by subtracting the reconstructed image having the first resolution from the original image having the first resolution, a clipping unit to obtain residue data having a third resolution by clipping the residue data having the first resolution, a prediction encoding unit to perform prediction encoding on the residue data having the third resolution, and a bitstream construction unit to generate an enhancement layer bitstream including the encoded residue data having the third resolution and the interpolation mode signal.

The interpolation mode signal may be determined by considering at least one of a picture type of the original image corresponding to a method of scanning the original image and a picture type of a reconstructed image at an enhancement layer.

The reconstructed image having the second resolution may be reconstructed to be the reconstructed image having the first resolution based on the interpolation mode signal indicating a frame basis, if the original image is obtained through progressive scanning.

The reconstructed image having the second resolution may be reconstructed to be the reconstructed image having the first resolution based on the interpolation mode signal indicating one of a frame and a field basis, if the original image is obtained through interlaced scanning.

The reconstructed image that is a frame image having the first resolution may be generated using a plurality of pixels adjacent to a pixel that is to be interpolated, which are included in the reconstructed image that is a frame image having the second resolution, if the original image is obtained through progressive scanning and the interpolation mode signal represents an interpolation mode on the frame basis.

The reconstructed image that is a frame image having the first resolution may be generated using a plurality of pixels adjacent to a pixel that is to be interpolated, in an even field image and an odd field image obtained from the reconstructed image that is a frame image having the second resolution, if the original image is obtained through interlaced scanning and the interpolation mode signal represents an interpolation mode based on interlaced scanning.

A reconstructed image having the first resolution of an even field may be generated using a plurality of pixels adjacent to a pixel that is to be interpolated, in a reconstructed image having the second resolution of an even field, and a reconstructed image having the first resolution of an odd field may be generated using a plurality of pixels adjacent to a pixel that is to be interpolated, in a reconstructed image having the second resolution of an odd field, if the original image is obtained through interlaced scanning and the interpolation mode signal represents an interpolation mode based on interlaced scanning.

To achieve the above and/or other aspects and advantages, one or more embodiments of the present invention may include a scalable video decoding apparatus including a first decoding unit to generate a reconstructed image having a second resolution by decoding a base layer bitstream of a scalable bitstream obtained by encoding an original image having a first resolution, and a second decoding unit to generate a final reconstructed image having the first resolution by reconstructing the reconstructed image having the second resolution to be an interim reconstructed image having the first resolution, in response to an interpolation mode signal contained in an enhancement layer bitstream of the scalable bitstream, and then decoding the enhancement layer bitstream by using the interim reconstructed image having the first resolution.

The interpolation mode signal may be determined by considering at least one of a picture type of the original image corresponding to a method of scanning the original image and a picture type of a reconstructed image at an enhancement layer.

The second decoding unit may include a resolution adjustment unit to generate the interim reconstructed image having the first resolution by extending bit depths of luminance and chrominance components of the reconstructed image having the second resolution while interpolating the chrominance components in response to the interpolation mode signal, a prediction decoding unit to reconstruct residue data having a third resolution by performing prediction encoding upon the enhancement layer bitstream, a tone mapping unit to generate residue data having the first resolution by extending a bit depth of the residue data having the third resolution, and an addition unit to generate the final reconstructed image having the first resolution by combining the interim reconstructed image having the first resolution and the residue data having the first resolution.

The second decoding unit may include a resolution adjustment unit to generate the interim reconstructed image having the first resolution by interpolating chrominance components of the reconstructed image having the second resolution in response to the interpolation mode signal, a prediction decoding unit to reconstruct residue data having the first resolution by performing prediction encoding upon the enhancement layer bitstream, and an addition unit to generate the final reconstructed image having the first resolution by combining the interim reconstructed image having the first resolution and the residue data having the first resolution.

To achieve the above and/or other aspects and advantages, one or more embodiments of the present invention may include an enhancement layer decoding apparatus including a resolution adjustment unit generating an interim reconstructed image having a first resolution by extending bit depths of luminance and chrominance components of a reconstructed image having a second resolution, which is obtained by decoding a base layer bitstream of a scalable bitstream, which is obtained by encoding an original image having the first resolution, while interpolating the chrominance components in response to an interpolation mode signal contained in an enhancement layer bitstream of the scalable bitstream, a prediction decoding unit reconstructing residue data having a third resolution by performing prediction encoding upon the enhancement layer bitstream, a tone mapping unit generating residue data having the first resolution by extending a bit depth of the residue data having the third resolution, and an addition unit generating a final reconstructed image having the first resolution by combining the interim reconstructed image having the first resolution and the residue data having the first resolution.

The reconstructed image having the second resolution may be reconstructed to be the interim reconstructed image having the first resolution based on the interpolation mode signal indicating a frame basis, if the original image is obtained through progressive scanning.

The reconstructed image having the second resolution may be reconstructed to be the interim reconstructed image having the first resolution, based on the interpolation mode signal indicating a frame or field basis, if the original image is obtained through interlaced scanning.

The interim reconstructed image having the first resolution may be generated using a plurality of pixels adjacent to a pixel that is to be interpolated, in the reconstructed image having the second resolution, where the interim reconstructed image having the first resolution and the reconstructed image having the second resolution are frame images, if the original image is obtained through progressive scanning and the interpolation mode signal indicates an interpolation mode on a frame basis.

The interim reconstructed image having the first resolution may be generated using a plurality of pixels adjacent to a pixel that is to be interpolated, in an even pixel and an odd pixel obtained from the reconstructed image having the second resolution, where the interim reconstructed image having the first resolution and the reconstructed image having the second resolution are frame images, if the original image is obtained through interlaced scanning and the interpolation mode signal represents an interpolation mode on a frame basis.

A reconstructed image having the first resolution of an even field may be generated using a plurality of pixels adjacent to a pixel that is to be interpolated, in a reconstructed image having the second resolution of an even field, and a reconstructed image having the first resolution of an odd field may be generated using a plurality of pixels adjacent to a pixel that is to be interpolated, in a reconstructed image having the second resolution of an odd field, if the original image is obtained through interlaced scanning and the interpolation mode signal represents an interpolation mode based on a field-type.

To achieve the above and/or other aspects and advantages, one or more embodiments of the present invention may include an enhancement layer decoding apparatus including, a resolution adjustment unit to generate an interim reconstructed image having a first resolution by interpolating chrominance components of a reconstructed image having a second resolution, which is obtained by decoding a base layer bitstream of a scalable bitstream obtained by encoding an original image having the first resolution, in response to an interpolation mode signal contained in an enhancement layer bitstream of the scalable bitstream, a prediction decoding unit to reconstruct residue data having the first resolution by performing prediction encoding upon the enhancement layer bitstream, and an addition unit to generate a final reconstructed image having the first resolution by combining the interim reconstructed image having the first resolution and the residue data having the first resolution.

To achieve the above and/or other aspects and advantages, one or more embodiments of the present invention may include a method of encoding scalable video, the method including generating a base layer bitstream, the generating the base layer bitstream including generating a reconstructed image having a second resolution, and encoding an original image having a first resolution into an encoded image having the second resolution, and generating an enhancement layer bitstream, the generating the enhancement layer bitstream including determining an interpolation mode based on an interpolation mode signal, reconstructing the reconstructed image having the second resolution into a reconstructed image having the first resolution based on the interpolation mode, encoding the original image having the first resolution by using the reconstructed image having the first resolution, where the enhancement layer bitstream contains additional information for generating an other reconstructed image having the first resolution or a reconstructed image having a third resolution.

To achieve the above and/or other aspects and advantages, one or more embodiments of the present invention may include a method of decoding scalable video, the method including determining an interpolation mode based on an interpolation mode signal contained in an enhancement layer bitstream of a scalable bitstream, decoding a base layer bitstream of the scalable bitstream to generate a reconstructed image having a second resolution by interpolating, in the determined interpolation mode, chrominance components of the reconstructed image having the second resolution, the base layer bitstream resulting from an encoding of an original image having a first resolution, generating an interim reconstructed image having the first resolution by extending bit depths of luminance and the chrominance components of the reconstructed image having the second resolution, reconstructing residue data having a third resolution by performing prediction encoding upon the enhancement layer bitstream, generating residue data having the first resolution by extending a bit depth of the residue data having the third resolution, and generating a final reconstructed image having the first resolution by combining the interim reconstructed image having the first resolution and the residue data having the first resolution.

The generating an interim reconstructed image having the first resolution may be based on the interpolation mode, and whether the original image was obtained through one of interlaced scanning and progressive scanning.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
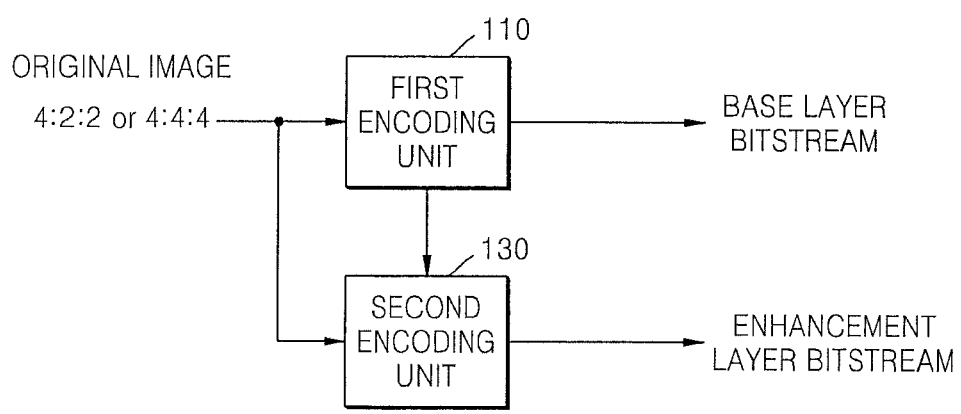
FIG. 1 is a block diagram of a scalable video encoding apparatus according to an embodiment of the present invention.

Reference will now be made in detail to embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram of a scalable video encoding apparatus having a first encoding unit 110 and a second encoding unit 130 according to an embodiment of the present invention.

Referring to FIG. 1, the first encoding unit 110 generates a base layer bitstream for generating a reconstructed image having a second resolution by encoding an original image having a first resolution into an encoded image having the second resolution, and provides a reconstructed image having the second resolution, which is obtained by decoding the encoded original image having the second resolution, to the second encoding unit 130. An encoding technique employed by the first encoding unit 110 may be a general video codec, e.g., MPEG-1, MPEG-2, MPEG-4, H.261, H.262, H.263, H.264, or SMPTE VC-1. According to an embodiment of the present invention, examples of the second resolution are a 4:2:0 format and 8 bits, and examples of the first resolution are a 4:2:2 format or a 4:4:4 format, which is higher than the second resolution, and N bits (N is a natural number equal to or greater than 10). According to another embodiment of the present invention, an example of the second resolution is the 4:2:0 format, and an example of the first resolution is the 4:2:2 format or the 4:4:4 format higher than the second resolution.

The second encoding unit 130 generates an enhancement layer bitstream containing additional information for generating a reconstructed image having the first resolution or a third resolution by reconstructing the reconstructed image having the second resolution, which is received from the first encoding unit 110, to be a reconstructed image having the first resolution in response to an interpolation mode signal, and then encoding the original image having the first resolution by using the reconstructed image having the first resolution. Here, the first resolution may be the 4:2:2 format or the 4:4:4 format, and the third resolution may be either the 4:2:2 format or the 4:4:4 format and 8 bits.

The base layer bitstream provided from the first encoding unit 110 and the enhancement layer bitstream provided from the second encoding unit 130 are individually combined to generate a scalable bitstream containing an interpolation mode signal.

Here, the first through third resolutions are not limited to the above examples and may be variously determined from a combination of image formats or bit depths.

Figure 2:
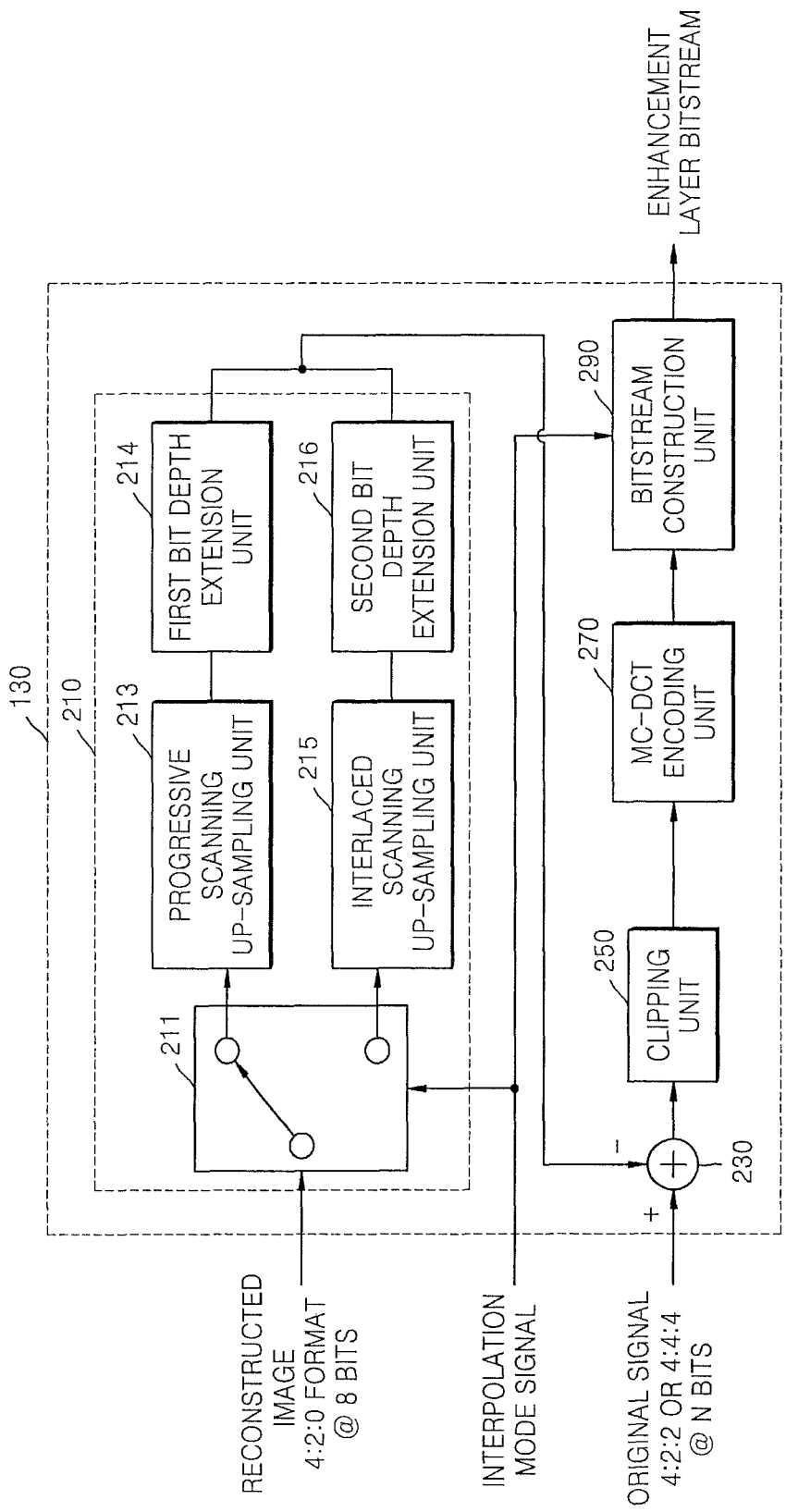
FIG. 2 is a block diagram of a second encoding unit of FIG. 1 according to an embodiment of the present invention.

FIG. 2 is a block diagram of the second encoding unit 130 of FIG. 1 according to an embodiment of the present invention. The second encoding unit 130 includes a resolution adjustment unit 210, a subtraction unit 230, a clipping unit 250, a motion-compensated discrete cosine transform (MC-DCT) encoding unit 270, and a bitstream construction unit 290. The resolution adjustment unit 210 includes a switching unit 211, a progressive scanning up-sampling unit 213, a first bit depth extension unit 214, an interlaced scanning up-sampling unit 215, and a second bit depth extension unit 216. The resolution adjustment unit 210, the subtraction unit 230, the clipping unit 250, the MC-DCT encoding unit 270 and the bitstream construction unit 290 may be, embodied as at least one processor. Here, the MC-DCT encoding unit 270 may be referred to as an inclusive prediction encoding unit.

Referring to FIG. 2, the resolution adjustment unit 210 generates a reconstructed image having a first resolution, e.g.,
a 4:2:2 format and N bits, or a 4:4:4 format and N bits, by receiving a reconstructed image having a second resolution, e.g., a 4:2:0 format and 8 bits, variably selecting one of a frame interpolation mode and a field interpolation mode, and extending the bit depths of luminance and chrominance components of the reconstructed image in the 4:2:0 format and having 8 bits while interpolating the color different components according to the selected interpolation mode. As an example, and for convenience of explanation, it is assumed that the first resolution is the 4:2:2 format and N bits.

More specifically, the switching unit 211 provides the reconstructed image having a 4:2:0 format and 8 bits to the progressive scanning up-sampling unit 213 or the interlaced scanning up-sampling unit 215, in response to an interpolation mode signal. The interpolation mode signal may be predetermined according to methods of respectively scanning an original image having the first resolution and the reconstructed image having the second resolution, or may be obtained by generating the reconstructed image having the second resolution by using various interpolation modes beforehand and selecting an interpolation mode with low error image energy. The interpolation mode signal is contained as syntax when constructing an enhancement layer bitstream. For example, if the original image having the first resolution is a frame image according to the progressive scanning method and the reconstructed image having the second resolution is a frame image according to the progressive scanning method, the switching unit 211 provides the reconstructed image having the 4:2:0 format and 8 bits to the progressive scanning up-sampling unit 213 according to a progressive scanning interpolation mode. If the original image having the first resolution and the reconstructed image having the second resolution are obtained through interlaced scanning, the switching unit 211 provides the reconstructed image having the 4:2:0 format and 8 bits to the interlaced scanning up-sampling unit 215 according to an interlaced scanning interpolation mode.

Figure 11:
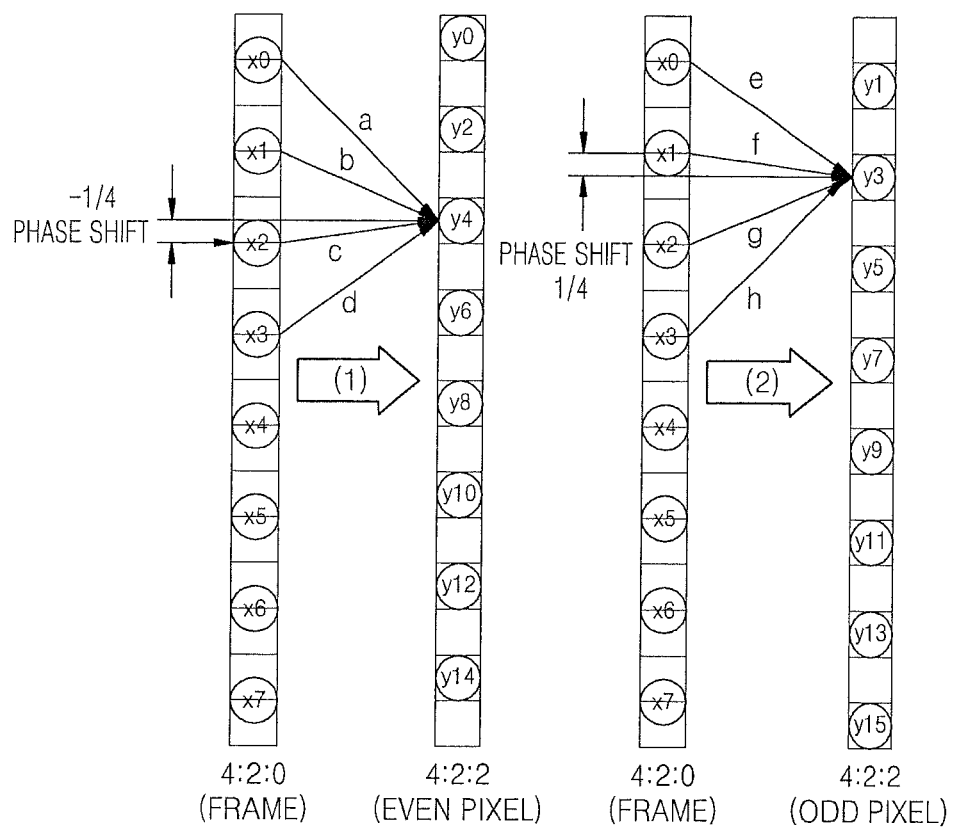
FIG. 11 illustrates a process of interpolating a chrominance component of a 4:2:0 frame image captured through progressive scanning into that of a 4:2:2 frame image captured through progressive scanning, according to an embodiment of the present invention.

The progressive scanning up-sampling unit 213 generates a frame-type reconstructed image having the first resolution by performing progressive scanning up-sampling on the reconstructed image having the second resolution, which is a frame image received from the switching unit 211. The first bit depth extension unit 214 extends a bit depth, i.e., a bit resolution, from 8 bits to N bits by performing a shift operation, for example. FIG. 11 illustrates an example of progressive scanning up-sampling of a frame-type reconstructed image having the second resolution.

Figure 12:
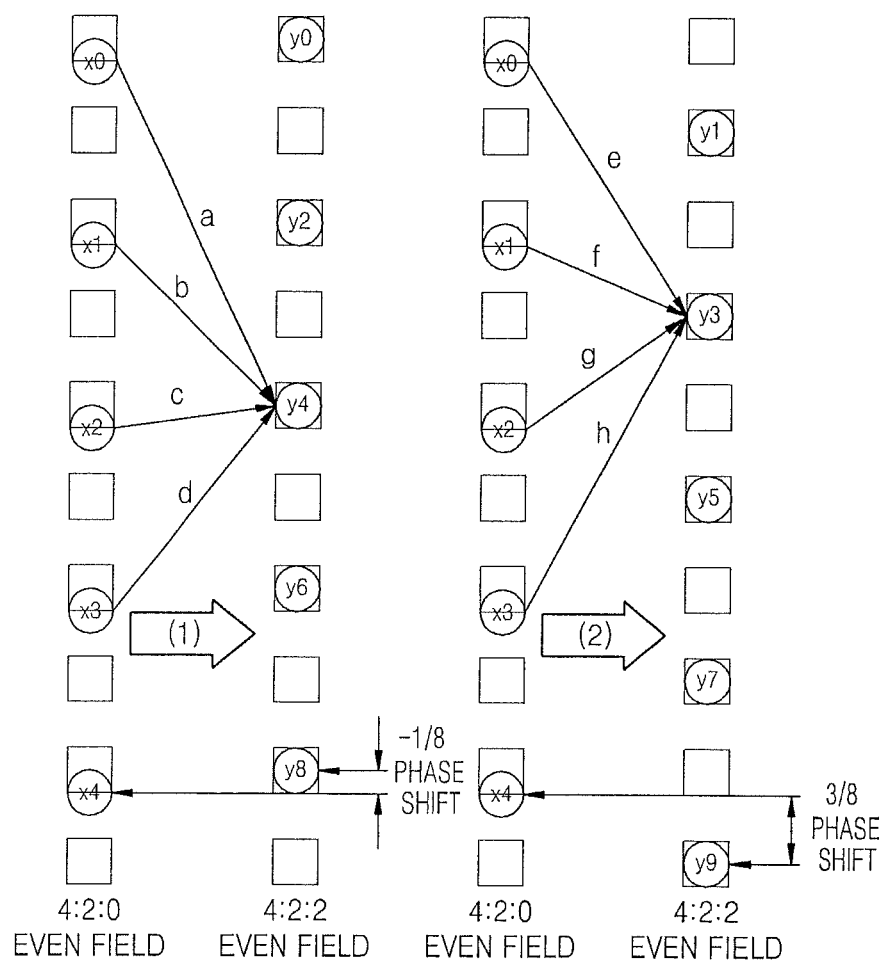
FIG. 12 illustrates a process of interpolating a chrominance component of an even field image in a 4:2:0 format which may be captured through interlaced scanning into that of an even field image in a 4:2:2 format, which may be captured through interlaced scanning, according to an embodiment of the present invention.
Figure 13:
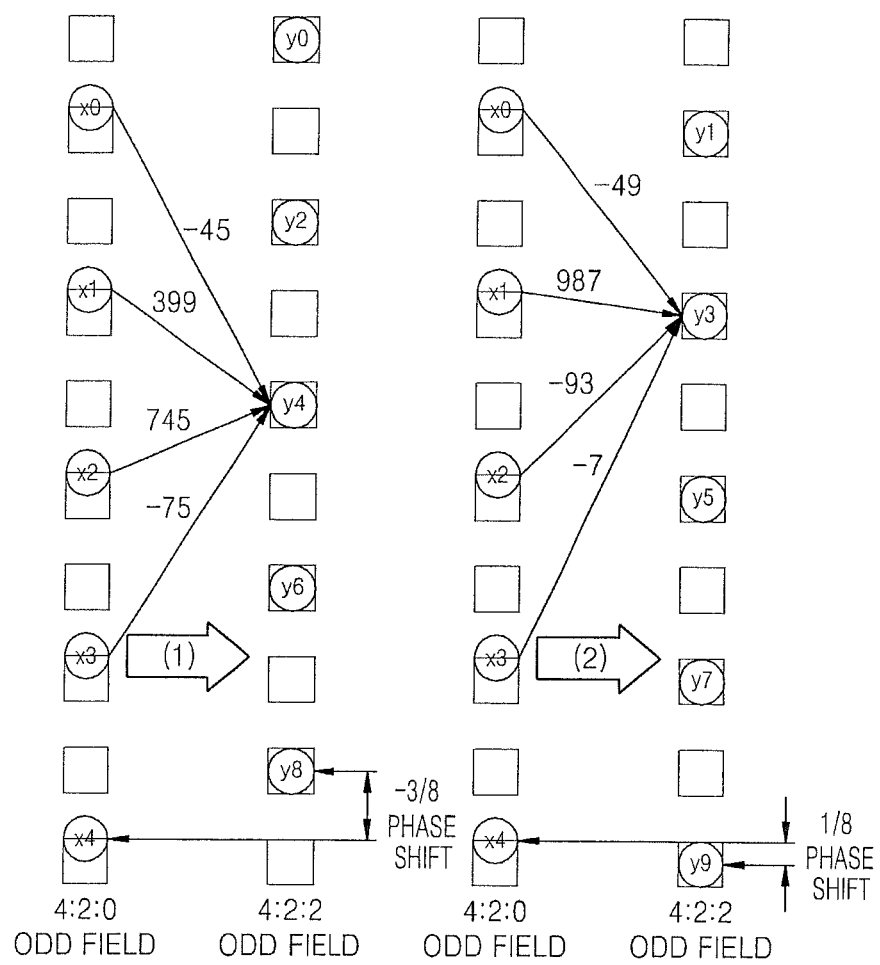
FIG. 13 illustrates a process of interpolating a chrominance component of an odd field image in a 4:2:0 format, which may be captured through interlaced scanning, into that of an odd field image in a 4:2:2 format, which may be captured through interlaced scanning, according to an embodiment of the present invention.
Figure 14:
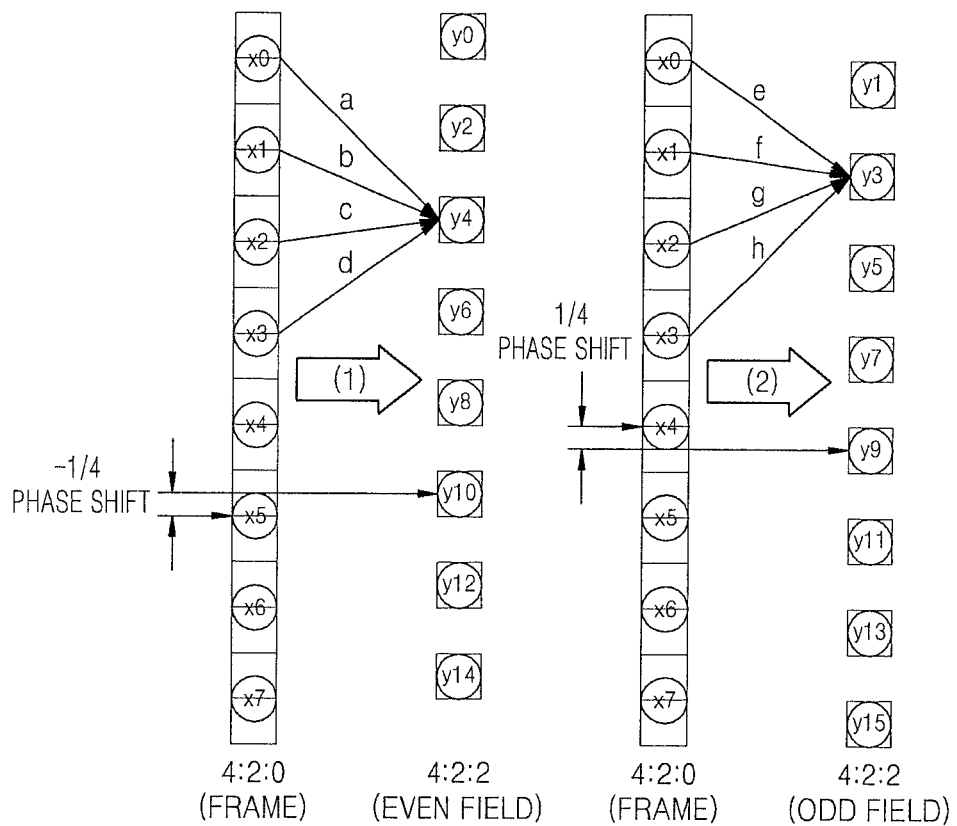
FIG. 14 illustrates a process of respectively interpolating chrominance components of odd and even field images of a 4:2:0 frame image captured through interlaced scanning into those of odd and even field images in a 4:2:2 format captured through interlaced scanning, according to an embodiment of the present.
Figure 15:
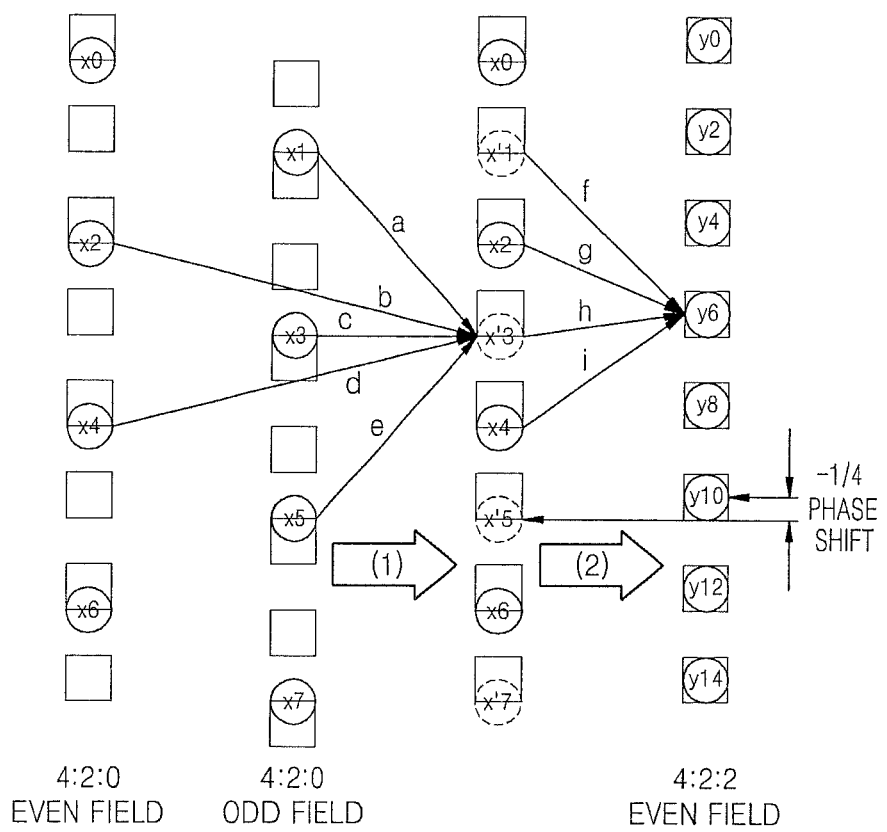
FIG. 15 illustrates a process of interpolating chrominance components of even and odd field images of a 4:2:0 field image captured through interlaced scanning into that of an even field in a 4:2:2 format, which may be captured through interlaced scanning, according to an embodiment of the present invention.
Figure 16:
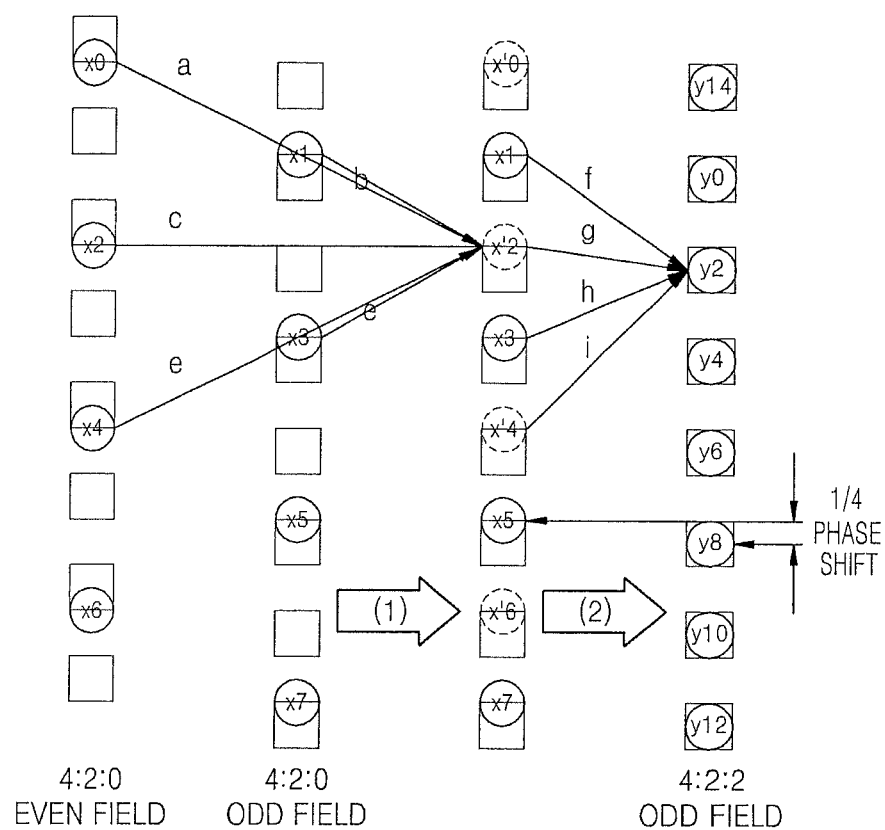
FIG. 16 illustrates a process of interpolating chrominance components of even and odd field images of a 4:2:0 frame image captured through interlaced scanning into that of an odd field in a 4:2:2 format captured through interlaced scanning, according to an embodiment of the present invention.

The interlaced scanning up-sampling unit 215 generates a field-type reconstructed image having the first resolution by performing interlaced scanning up-sampling on the reconstructed image having the second resolution, which is a the frame or field image received from the switching unit 211. The second bit depth extension unit 216 extends a bit depth, i.e., a bit resolution, from 8 bits to N bits by performing the shift operation, for example. FIGS. 12 and 13 illustrate examples of interlaced scanning up-sampling of a field-type reconstructed image having the second resolution. FIG. 14 illustrates an example of interlaced scanning up-sampling of a frame-type reconstructed image having the second resolution. FIGS. 15 and 16 illustrate examples of interlaced scanning up-sampling of a field-type reconstructed image having the second resolution. That is, the interlaced scanning up-sampling unit 215 may be embodied based on the methods illustrated in FIGS. 12 and 13, FIG. 14, or FIGS. 15 and 16.

The subtraction unit 230 obtains residue data by subtracting the reconstructed image having first resolution, which is received from the resolution adjustment unit 210, from the original image having the first resolution.

The clipping unit 250 generates residue data having a third resolution, e.g., a 4:2:2 format and 8 bits by clipping the residue data having the first resolution, e.g. for example, the 4:2:2 format and N bits.

The MC-DCT encoding unit 270 performs MC-DCT-based encoding on the residue data having the 4:2:2 format and 8 bits, which is received from the clipping unit 250.

The bitstream construction unit 290 generates an enhancement layer stream including: 1) the encoded residue data having the third resolution, which is received from the MC-DCT encoding unit 270; and 2) the interpolation mode signal.

Figure 3:
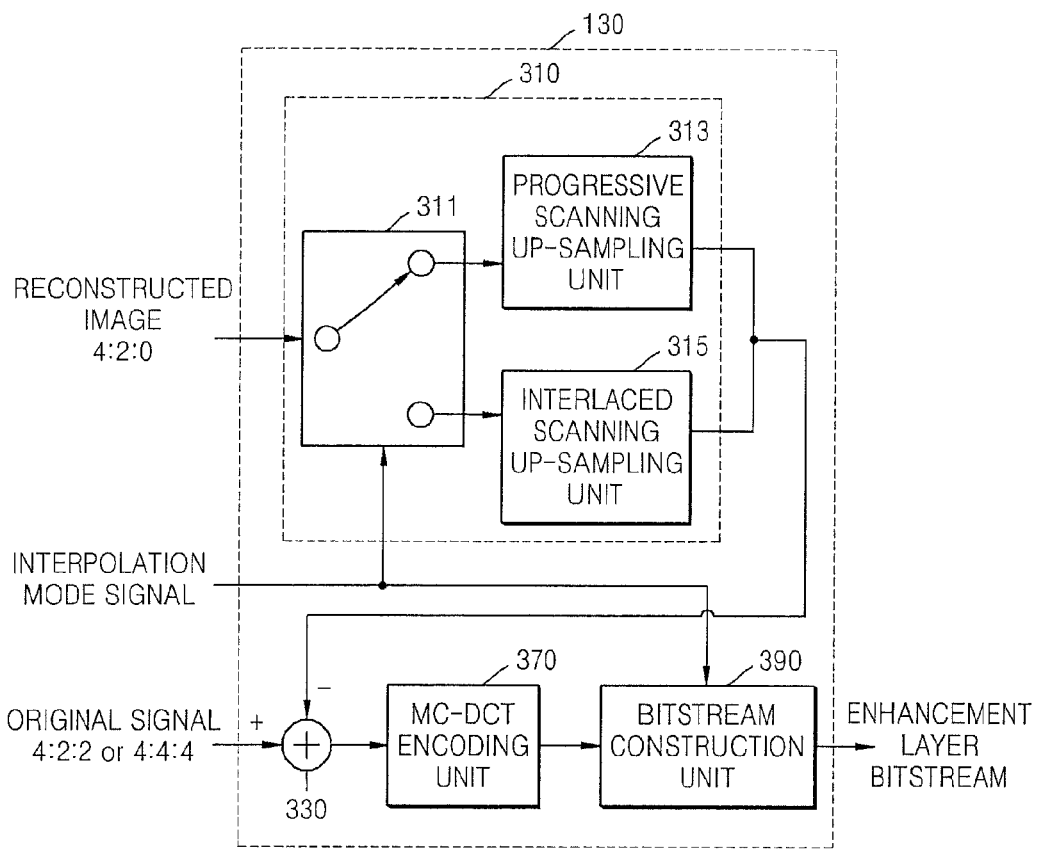
FIG. 3 is a block diagram of a second encoding unit of FIG. 1 according to an embodiment of the present invention.

FIG. 3 is a block diagram of the second encoding unit 130 of FIG. 1 according to an embodiment of the present invention. The second encoding unit 130 may include a resolution adjustment unit 310, a subtraction unit 330, an MC-DCT encoding unit 370 and a bitstream construction unit 390. The resolution adjustment unit 310 may include a switching unit 311, a progressive scanning up-sampling unit 313 and an interlaced scanning up-sampling unit 315. The resolution adjustment unit 310, the subtraction unit 330, the MC-DCT encoding unit 370 and the bitstream construction unit 390 may be embodied as at least one processor. The second encoding unit 130 illustrated in FIG. 3 is different from that illustrated in FIG. 2 regarding the definition of the first and the second resolutions and in that the third resolution is not used.

Referring to FIG. 3, the resolution adjustment unit 310 receives a reconstructed image having the second resolution, e.g., a 4:2:0 format, and generates a reconstructed image having the first resolution, e.g., a 4:2:2 format or a 4:4:4 format, by variably selecting one of a progressive scanning interpolation mode and an interlaced scanning interpolation mode and then interpolating chrominance components of the reconstructed image in the 4:2:0 format according to the selected interpolation mode. As an example, and for convenience of explanation, it is assumed that the first resolution is the 4:2:2 format. The constituents of the resolution adjustment unit 310 are the same as in FIG. 2, and therefore, a detailed description thereof will be omitted here.

The subtraction unit 330 obtains residue data by subtracting the reconstructed image having the first resolution, which is received from the resolution adjustment unit 310, from an original image having the first resolution.

The MC-DCT encoding unit 370 performs MC-DCT based encoding on the residue data having the first resolution, i.e. for example, the 4:2:2 format.

The bitstream construction unit 390 generates an enhancement layer bitstream including the encoded residual data having the first resolution, which is received from the MC-DCT encoding unit 370, and an interpolation mode signal.

Figure 4:
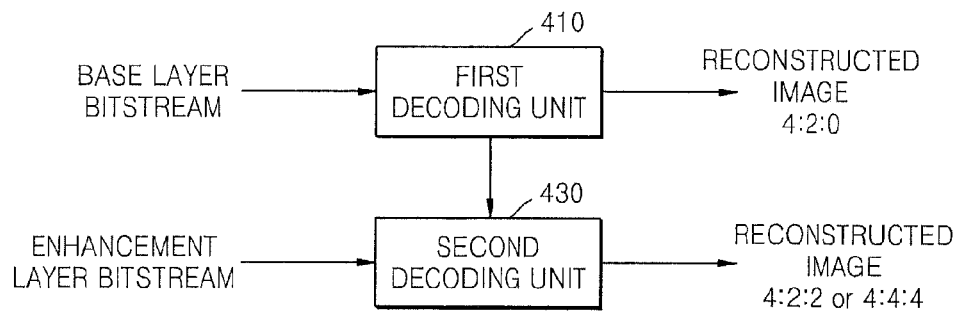
FIG. 4 is a block diagram of a scalable video decoding apparatus according to an embodiment of the present invention.

FIG. 4 is a block diagram of a scalable video decoding apparatus including a first decoding unit 410 and a second decoding unit 430 according to an embodiment of the present invention.

Referring to FIG. 4, the first decoding unit 410 generates a reconstructed image having a second resolution by decoding a base layer bitstream contained in a scalable bitstream. The first decoding unit 410 corresponds to the first encoding unit 110 illustrated in FIG. 1.

The second decoding unit 430 generates a final reconstructed image having a first resolution by reconstructing the reconstructed image having the second resolution, which is received from the first decoding unit 410, to be a reconstructed image having the first resolution in response to an interpolation mode signal contained in an enhancement layer bitstream included in a scalable bitstream and then decoding the enhancement layer bitstream by using the reconstructed image having the first resolution.

The first resolution and the second resolution are defined as described above with reference to FIGS. 1 and 3.

Figure 5:
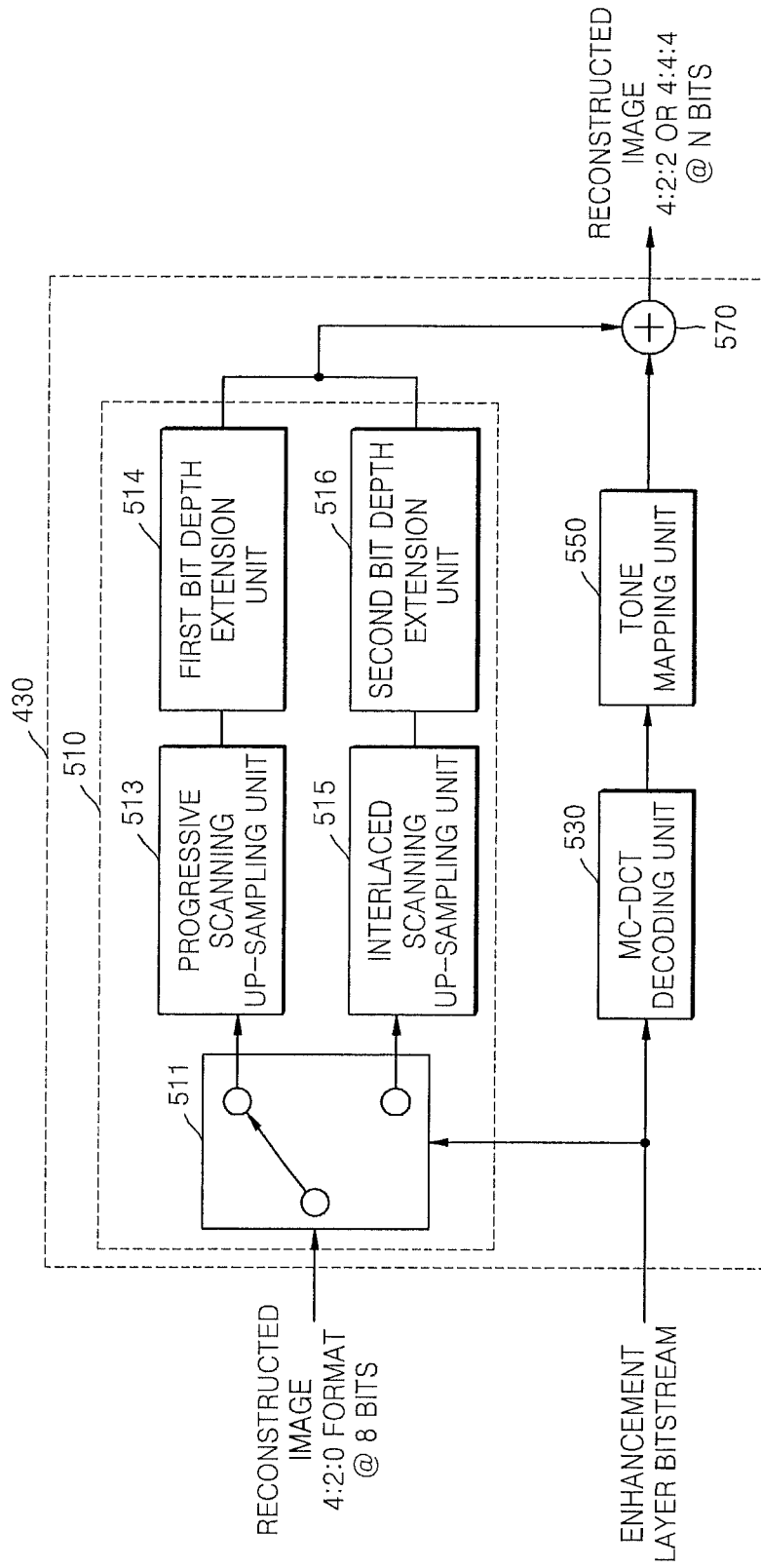
FIG. 5 is a block diagram of a second decoding unit of FIG. 4 according to an embodiment of the present invention.

FIG. 5 is a block diagram of the second decoding unit 430 illustrated in FIG. 4 according to an embodiment of the present invention. The second decoding unit 430 includes a resolution adjustment unit 510, an MC-DCT decoding unit 530, a tone mapping unit 550 and an addition unit 570. The resolution adjustment unit 510 may include a switching unit 511, a progressive scanning up-sampling unit 513, a first bit depth extension unit 514, an interlaced scanning up-sampling unit 515 and a second bit depth extension unit 516. The resolution adjustment unit 510, the MC-DCT decoding unit 530, the tone mapping unit 550 and the addition unit 570 may be embodied as at least one processor. The second decoding unit 430 illustrated in FIG. 5 corresponds to the first encoding unit 130 illustrated in FIG. 2. The MC-DCT decoding unit 530 may be referred to as an inclusive prediction decoding unit.

Referring to FIG. 5, the resolution adjustment unit 510 generates a reconstructed image having a first resolution, e.g., a 4:2:2 format and N bits, or a 4:4:4 format and N bits, by extending the bit depths of luminance and chrominance components of a reconstructed image having a second resolution, i.e. for example, a 4:2:0 format and 8 bits, while interpolating the chrominance components in response to an interpolation mode signal contained in the enhancement layer bitstream. As an example, and for convenience of explanation, it is assumed that the first resolution uses the 4:2:2 format and N bits.

More specifically, the switching unit 511 provides the reconstructed image having the 4:2:0 format and 8 bits to one of the progressive scanning up-sampling unit 513 and the interlaced scanning up-sampling unit 515, in response to the interpolation mode signal. The progressive scanning up-sampling unit 513 generates a frame-type reconstructed image having the first resolution by performing progressive scanning up-sampling on the reconstructed image having the second resolution, which is a frame image received from the switching unit 511. For example, the first bit depth extension unit 514 extends bit depth, i.e., a bit resolution, from 8 bits to N bits by performing the shift operation. The interlaced scanning up-sampling unit 515 generates a field-type reconstructed image having the first resolution by performing interlaced scanning up-sampling on the reconstructed image having the second resolution, which is a frame or field image received from the switching unit 511. For example, the second bit depth extension unit 516 extends a bit depth, i.e., a bit resolution, from 8 bits to N bits by performing the shift operation. The progressive scanning up-sampling unit 513 and the interlaced scanning up-sampling unit 515 may be the same as the progressive scanning up-sampling unit 213 and the interlaced scanning up-sampling unit 215 illustrated in FIG. 2.

The MC-DCT decoding unit 530 reconstructs residue data having a third resolution, i.e. for example, the 4:2:2 format and 8 bits by performing MC-DCT based decoding on an enhancement layer bitstream contained in a scalable bitstream.

The tone mapping unit 550 generates residue data having the first resolution, i.e. for example, the 4:2:2 format and N bits, by extending the bit depth of the residue data having the third resolution, which is received from the MC-DCT decoding unit 530, according to a tone mapping method.

The addition unit 570 generates a final reconstructed image having the first resolution by combining the reconstructed image having the first resolution, i.e. for example, the 4:2:2 format and N bits, which is received from the resolution adjustment unit 510 and the residue data having the first resolution, which is received from the tone mapping unit 550.

Figure 6:
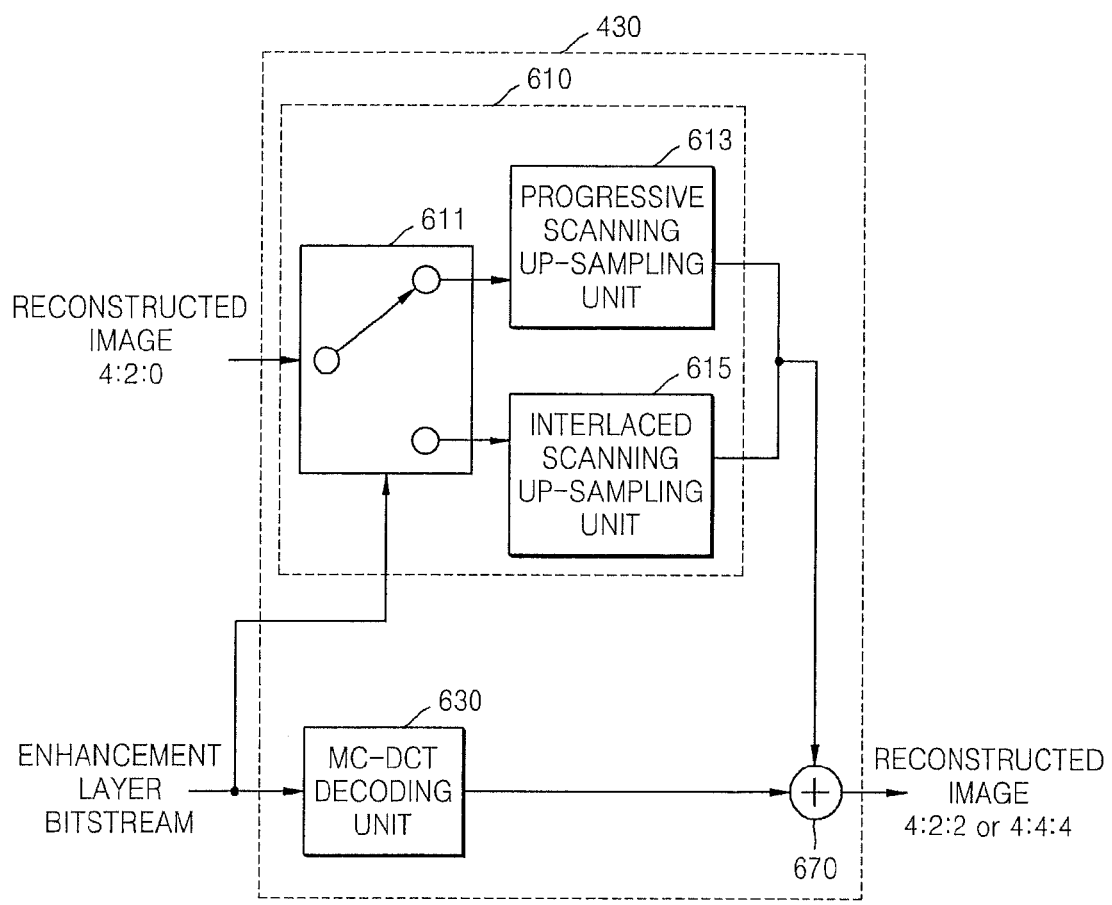
FIG. 6 is a block diagram of a second decoding unit of FIG. 4 according to an embodiment of the present invention.

FIG. 6 is a block diagram of the second decoding unit illustrated in FIG. 4 according to an embodiment of the present invention. The second decoding unit 430 includes a resolution adjustment unit 610, an MC-DCT decoding unit 630, and an addition unit 670. The resolution adjustment unit 610 may include a switching unit 611, a progressive scanning up-sampling unit 613 and an interlaced scanning up-sampling unit 615. The resolution adjustment unit 610, the MC-DCT decoding unit 630, and the addition unit 670 may be embodied as at least one processor. The second decoding unit 430 illustrated in FIG. 6 corresponds to the second encoding unit 130 illustrated in FIG. 3.

Referring to FIG. 6, the resolution adjustment unit 610 generates a reconstructed image having a first resolution, e.g., a 4:2:2 format or a 4:4:4 format, by interpolating chrominance components of a reconstructed image having a second resolution, i.e. for example, a 4:2:0 format, in response to an interpolation mode signal contained in an enhancement layer bitstream. As an example, and for convenience of explanation, it is assumed that the first resolution uses the 4:2:2 format. The constituents of the resolution adjustment unit 610 may be the same as illustrated in FIG. 5.

The MC-DCT decoding unit 630 reconstructs residue data having the first resolution by performing MC-DCT based decoding on an enhancement layer bitstream contained in a scalable bitstream.

The addition unit 670 generates a final reconstructed image having the first resolution by combining the reconstructed image having the first resolution, i.e. for example, the 4:2:2 format, which is received from the resolution adjustment unit 610 and the residue data having the first resolution, which is received from the MC-DCT decoding unit 630.

In embodiments of the scalable video encoding/decoding apparatus according to the present invention, an interpolation mode is determined by considering at least one of a picture type of an original image corresponding to a scanning method of the original image and a picture type of a reconstructed image at an enhancement layer, and the resolution of a reconstructed image at a lower layer is adjusted according to the determined interpolation mode, thereby enabling an efficient prediction between the upper and lower layers, i.e., the enhancement and base layers. As a result, the encoding efficiency at the enhancement layer and the quality of the reconstructed image at the enhancement layer can be improved. Also, not only the existing, various video codecs can be supported but also a high-quality reconstructed image can be provided, thereby easily securing and expanding the existing market.

Figure 7:
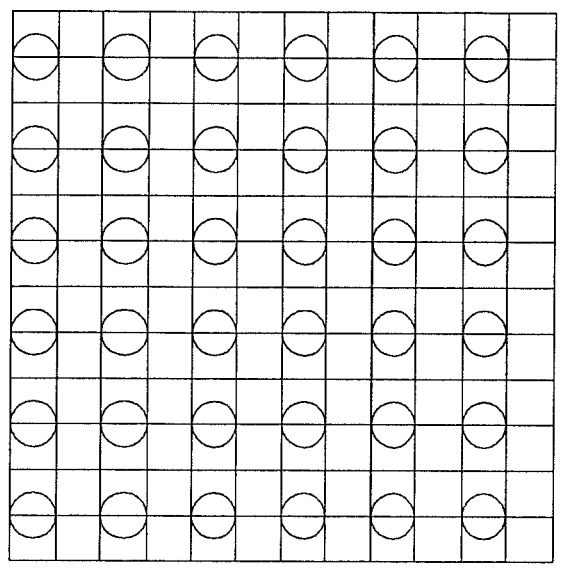
FIG. 7 illustrates a pixel structure of a frame image in a 4:2:0 format.

FIG. 7 illustrates a pixel structure of a frame image in a 4:2:0 format. In general, an image captured through progressive scanning may be received in the format of a frame-type image as illustrated in FIG. 7, and encoded on a predetermined sized block basis.

Figure 8:
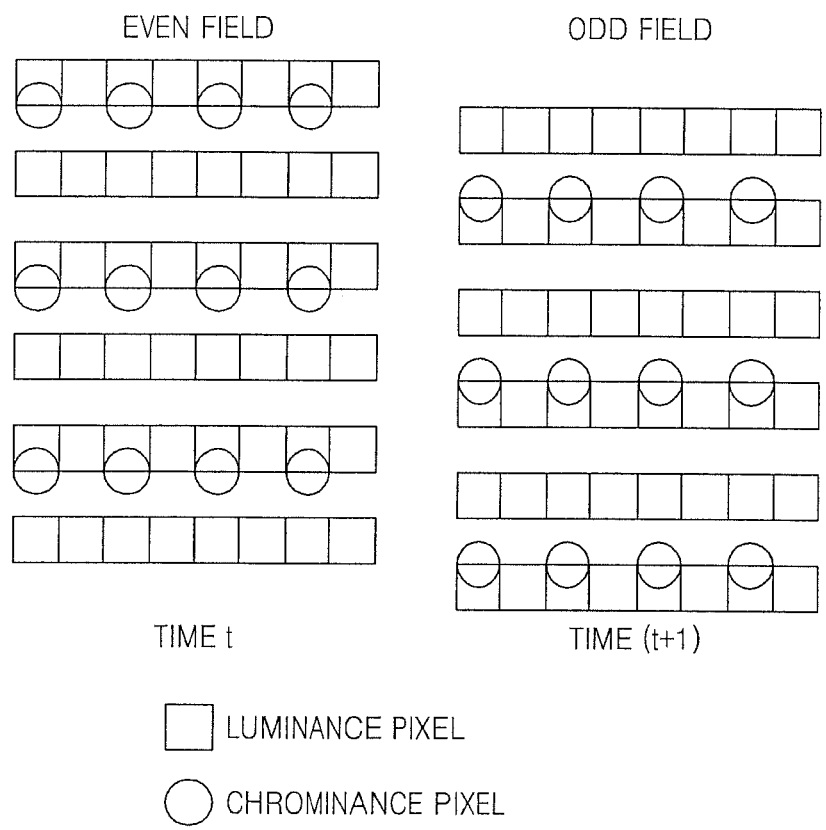
FIG. 8 illustrates a pixel structure of a field image in a 4:2:0 format.

FIG. 8 illustrates a pixel structure of a field image in a 4:2:0 format. In general, an image captured through interlaced scanning may be received in the format of a frame-type image as illustrated in FIG. 7 or in the format of a field-type image as illustrated in FIG. 8, and then encoded on a predetermined sized block basis.

Figure 9:
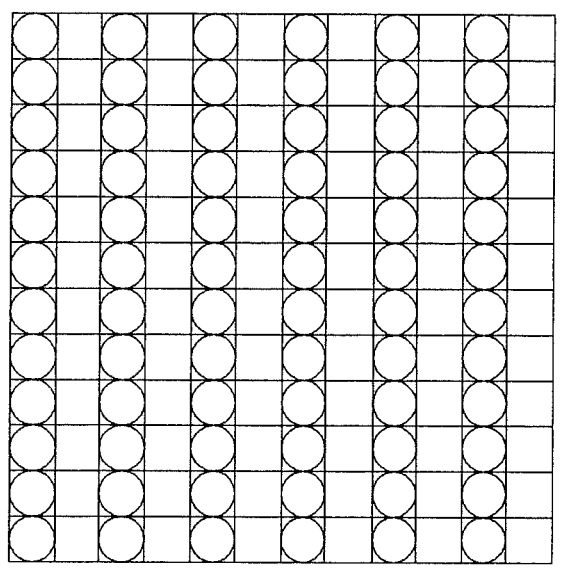
FIG. 9 illustrates a pixel structure of a frame image in a 4:2:2 format.

FIG. 9 illustrates a pixel structure of a frame image in a 4:2:2 format. In general, an image captured through progressive scanning may be received in the format of a frame-type image as illustrated in FIG. 9, and encoded on a predetermined sized block basis.

Figure 10:
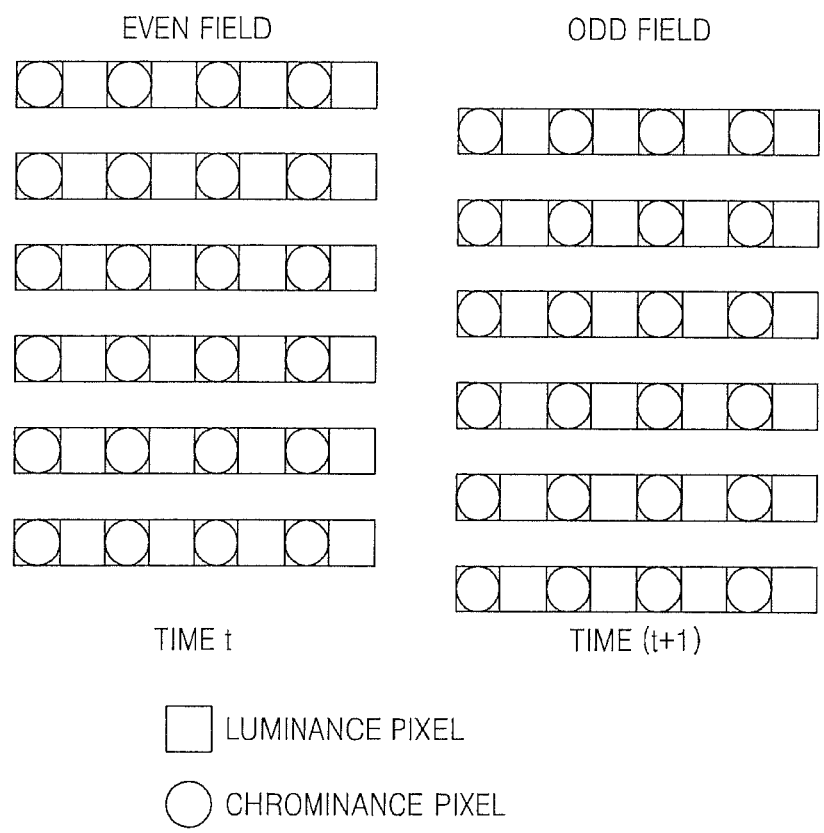
FIG. 10 illustrates a pixel structure of a field image in a 4:2:2 format.

FIG. 10 illustrates a pixel structure of a field image in a 4:2:2 format. In general, an image captured through interlaced scanning may be received in the format of a frame-type image as illustrated in FIG. 9 or the format of a field-type image as illustrated in FIG. 10, and encoded on a predetermined sized block basis.

FIGS. 11 through 16 illustrate field up-sampling and frame up-sampling which are interpolation methods of predicting chrominance components of an enhancement layer based on pixel information of a base layer, according to embodiments of the present invention. In FIGS. 11 through 16, the total number of and weights allocated to pixels used for interpolation are illustrative, and may be variously determined according to the performance of a reconstructed image.

More specifically, FIG. 11 illustrates a process of interpolating a chrominance component of a 4:2:0 frame image captured through progressive scanning into that of a 4:2:2 frame image captured through progressive scanning, according to an embodiment of the present invention. If an input image is obtained through progressive scanning, chrominance components are interpolated in units of frame images.

Referring to FIG. 11, interpolation of an even pixel in the 4:2:2 frame image is as indicated with arrow (1), and is performed using Equation 1, shown below. For example, a chrominance component of a y4 pixel in the 4:2:2 frame image is interpolated using chrominance components of a plurality of pixels x0, x1, x2, and x3 adjacent to a y4 pixel in the 4:2:0 format. In this case, the closer to the y4 pixel, the greater a weight.

$$y[2n] = (a \cdot x[n-2] + b \cdot [n-1] + c \cdot x[n] + d \cdot x[n+1]) = \quad \text{Equation 1}$$
$$(-3/128 \cdot x[n-2] + 29/128 \cdot x[n-1] +$$
$$111/128 \cdot x[n] - 9/128 \cdot x[n+1])$$

Equation 1 can be optimized, resulting in Equation 2:

$$y[2n]=(-3 \cdot x[n-2]+29 \cdot x[n-1]+111 \cdot x[n]-9 \cdot x[n+1]+64) \gg 7 \quad \text{Equation 2}$$

Referring to FIG. 11, interpolation of an odd pixel in the 4:2:2 frame image is as indicated with arrow (2) and is performed using Equation 3, shown below. For example, a chrominance component of a y3 pixel in the 4:2:2 frame image is interpolated using chrominance components of a plurality of pixels x0, x1, x2, and x3, adjacent to a y3 pixel, in the 4:2:0 format. In this case, the closer to the y3 pixel, the greater a weight.

$$y[2n+1] = (e \cdot x[n-1] + f \cdot [n] + g \cdot x[n+1] + h \cdot x[n+2]) = \quad \text{Equation 3}$$
$$(-9/128 \cdot x[n-1] + 111/128 \cdot x[n] +$$
$$28/128 \cdot x[n+1] - 3/128 \cdot x[n+2])$$

Equation 3 can be optimized, resulting in Equation 4:

$$y[2n+1]=(-9 \cdot x[n-1]+111 \cdot x[n]+28 \cdot x[n+1]-3 \cdot x[n+2]+64) \gg 7 \quad \text{Equation 4}$$

FIG. 12 illustrates a process of interpolating a chrominance component of an even field image in a 4:2:0 format, which may be captured through interlaced scanning into that of an even field image in a 4:2:2 format, which may be captured through interlaced scanning, according to an embodiment of the present invention.

Referring to FIG. 12, interpolation of a −⅛ phase-shifted pixel in an even field in a 4:2:2 format with respect to a chrominance component of an even field in 4:2:0 format, is as indicated with arrow (1) and is performed using Equation 5, shown below.

$$y[2n] = (a \cdot x[n-2] + b \cdot [n-1] + c \cdot x[n] + d \cdot x[n+1]) =$$
$$(-7/1024 \cdot x[n-2] + 93/1024 \cdot x[n-1] +$$
$$987/1024 \cdot x[n] - 49/1024 \cdot x[n+1])$$

Equation 5

Equation 5 can be optimized, resulting in Equation 6:

$$y[2n]=(-7 \cdot x[n-2]+93 \cdot x[n-1]+987 \cdot x[n]-49 \cdot x[n+1]+ 512) \gg 10$$

Equation 6

Interpolation of a ⅜ phase-shifted pixel in an even field in a 4:2:2 format with respect to a chrominance component of an even pixel in a 4:2:0 format is as indicated with arrow (2), and is performed using Equation 7, shown below.

$$y[2n+1] = (e \cdot x[n-1] + f \cdot [n] + g \cdot x[n+1] + h \cdot x[n+2]) =$$
$$(-75/1024 \cdot x[n-1] + 745/1024 \cdot x[n] +$$
$$399/1024 \cdot x[n+1] - 45/1024 \cdot x[n+2])$$

Equation 7

Equation 7 can be optimized, resulting in Equation 8:

$$y[2n+1]=(-75 \cdot x[n-1]+745 \cdot x[n]+399 \cdot x[n+1]-45 \cdot x[n+2]+512) \gg 10$$

Equation 8

FIG. 13 illustrates a process of interpolating a chrominance component of an odd field image in a 4:2:0 format, which may be captured through interlaced scanning, into that of an odd field image in a 4:2:2 format, which may be captured through interlaced scanning, according to an embodiment of the present invention.

Referring to FIG. 13, interpolation of a −⅜ phase-shifted pixel in an odd field in a 4:2:2 format with respect to a chrominance component of an odd field in a 4:2:0 format is as indicated with arrow (1), and is performed using Equation 9, shown below.

$$y[2n] = (a \cdot x[n-2] + b \cdot [n-1] + c \cdot x[n] + d \cdot x[n+1]) =$$
$$(-45/1024 \cdot x[n-2] + 399/1024 \cdot x[n-1] +$$
$$745/1024 \cdot x[n] - 75/1024 \cdot x[n+1])$$

Equation 9

Equation 9 can be optimized, resulting in Equation 10:

$$y[2n]=(-45 \cdot x[n-2]+399 \cdot x[n-1]+745 \cdot x[n]-75 \cdot x[n+1]+ 512) \gg 10$$

Equation 10

Interpolation of a ⅛ phase-shifted pixel in an odd field in the 4:2:2 format with respect to a chrominance component of an odd field in the 4:2:0 format is as indicated with arrow (2), and is performed using Equation 11, shown below.

$$y[2n+1] = (e \cdot x[n-1] + f \cdot [n] + g \cdot x[n+1] + h \cdot x[n+2]) =$$
$$(-49/1024 \cdot x[n-1] + 987/1024 \cdot x[n] -$$
$$93/1024 \cdot x[n+1] - 7/1024 \cdot x[n+2])$$

Equation 11

Equation 11 can be optimized, resulting in Equation 12:

$$y[2n+1]=(-49 \cdot x[n-1]+987 \cdot x[n]-93 \cdot x[n+1]-7 \cdot x[n+2]+ 512) \gg 10$$

Equation 12

FIG. 14 illustrates a process of respectively interpolating chrominance components of odd and even field images of a 4:2:0 frame image captured through interlaced scanning into those of odd and even field images in a 4:2:2 format captured through interlaced scanning, according to an embodiment of the present.

Referring to FIG. 14, interpolation of a pixel in an even field in a 4:2:2 format is as indicated with arrow (1), and is performed using Equation 13, shown below.

$$y[2n] = (a \cdot x[n-2] + b \cdot [n-1] + c \cdot x[n] + d \cdot x[n+1]) =$$
$$(-3/128 \cdot x[n-2] + 29/128 \cdot x[n-1] +$$
$$111/128 \cdot x[n] - 9/128 \cdot x[n+1])$$

Equation 13

Equation 13 can be optimized, resulting in Equation 14:

$$y[2n]=(-3 \cdot x[n-2]+29 \cdot x[n-1]+111 \cdot x[n]-9 \cdot x[n+1]+64) \gg 7$$

Equation 14

Interpolation of a pixel in an odd field in the 4:2:2 format is as indicated with arrow (2), and is performed using Equation 15, shown below.

$$y[2n+1] = (e \cdot x[n-1] + f \cdot [n] + g \cdot x[n+1] + h \cdot x[n+2]) =$$
$$(-9/128 \cdot x[n-1] + 111/128 \cdot x[n] +$$
$$28/128 \cdot x[n+1] - 3/128 \cdot x[n+2])$$

Equation 15

Equation 15 can be optimized, resulting in Equation 16:

$$y[2n+1]=(-9 \cdot x[n-1]+111 \cdot x[n]+28 \cdot x[n+1]-3 \cdot x[n+2]+64) \gg 7$$

Equation 16

FIG. 15 illustrates a process of interpolating chrominance components of even and odd field images of a 4:2:0 field image captured through interlaced scanning into a chrominance component of an even field in a 4:2:2 format, which may be captured through interlaced scanning, according to an embodiment of the present invention. To this end, first, a field image may be de-interlacing filtered in the format of a frame-type and then may be interpolated into an even field.

De-interlacing filtering of the field image in the format of a frame is as illustrated with arrow (1), and is performed using Equation 17, shown below.

$$y[2n+1] = (a \cdot x[2n-1] + b \cdot [2n] +$$
$$c \cdot x[2n+1] + d \cdot x[2n+2] + e \cdot x[2n+3]) =$$
$$(-1/16 \cdot x[2n-1] + 8/16 \cdot x[2n] + 2/16 \cdot x[2n+1] +$$
$$8/16 \cdot x[2n+2] - 1/16 \cdot x[2n+3])$$

Equation 17

Equation 17 can be optimized, resulting in Equation 18:

$$y[2n+1]=(-1 \cdot x[2n-1]+8 \cdot [2n]+2 \cdot x[2n+1]+8 \cdot x[2n+2]- 1 \cdot x[2n+3]+8) \gg 4$$

Equation 18

Interpolation of −¼ phase-shifted pixel in an even field in a 4:2:2 format using in even pixels in an image reconstructed in the format of a frame-type is as indicated with arrow (2) and is performed using Equation 19, shown below.

$$y[2n] = (f \cdot x[n-1] + g \cdot x'[n] + h \cdot x[n+1] + i \cdot x'[n+2]) =$$
$$(-3/128 \cdot x[n-1] + 29/128 \cdot x'[n] +$$
$$111/128 \cdot x[n+1] - 9/128 \cdot x'[n+2])$$
$$y[2n+1] = (f \cdot x'[n] + g \cdot x[n+1] + h \cdot x'[n+2] +$$
$$i \cdot x[n+3]) = (-3/128 \cdot x'[n] + 29/128 \cdot x[n+1] +$$
$$111/128 \cdot x'[n+2] - 9/128 \cdot x[n+3])$$

Equation 19

Equation 19 can be optimized, resulting in Equation 20:

$$y[2n]=(-3 \cdot x[n-1]+29 \cdot x'[n]+111 \cdot x[n+1]-9 \cdot x'[n+2]+64) \gg 7$$

$$y[2n+1]=(-3 \cdot x'[n]+29 \cdot x[n+1]+111 \cdot x'[n+2]-9 \cdot x[n+3]+64) \gg 7$$

Equation 20

FIG. 16 illustrates a process of interpolating chrominance components of even and odd field images of a 4:2:0 frame image captured through interlaced scanning into a chrominance component of an odd field in a 4:2:2 format captured through interlaced scanning, according to an embodiment of the present invention. To this end, first, a field image may be de-interlacing filtered in the format of a frame-type and then may be interpolated into an odd field.

Referring to FIG. 16, de-interlacing filtering of a field image in the format of a frame is as indicated with arrow (1) and is performed using Equation 21, shown below.

$$y[2n] = (a \cdot x[2n-2] + b \cdot [2n-1] +$$
$$c \cdot x[2n] + d \cdot x[2n+1] + e \cdot x[2n+2]) =$$
$$(-1/16 \cdot x[2n-2] + 8/16 \cdot x[2n-1] + 2/16 \cdot x[2n] +$$
$$8/16 \cdot x[2n+1] - 1/16 \cdot x[2n+2])$$

Equation 21

Equation 21 can be optimized, resulting in Equation 22:

$$y[2n]=(-1 \cdot x[2n-2]+8 \cdot x[2n-1]+2 \cdot x[2n]+8 \cdot x[2n+1]-1 \cdot x[2n+2]+8) \gg 4$$

Equation 22

Interpolation of ¼ phase-shifted pixel in an odd field in a 4:2:2 format using in odd pixels in an image reconstructed in the format of a frame-type is as indicated with arrow (2) and is performed using Equation 23, shown below.

$$y[2n] = (f \cdot x[n] + g \cdot x'[n+1] + h \cdot x[n+2] + i \cdot x'[n+3]) =$$
$$(-9/128 \cdot x[n] + 111/128 \cdot x'[n+1] +$$
$$29/128 \cdot x[n+2] - 3/128 \cdot x'[n+3])$$
$$y[2n+1] = (f \cdot x'[n+1] + g \cdot x[n+2] +$$
$$h \cdot x'[n+3] + i \cdot x[n+4]) =$$
$$(-9/128 \cdot x'[n+1] + 111/128 \cdot x[n+2] +$$
$$29/128 \cdot x'[n+3] - 3/128 \cdot x[n+4])$$

Equation 23

Equation 23 can be optimized, resulting in Equation 24:

$$y[2n]=(-9 \cdot x[n]+111 \cdot x'[n+1]+29 \cdot x[n+2]-3 \cdot x'[n+3]+64) \gg 7$$

$$y[2n+1]=(-9 \cdot x'[n+1]+111 \cdot x[n+2]+29 \cdot x'[n+3]-3 \cdot x[n+4]+64) \gg 7$$

Equation 24

In embodiments of the present invention, the same interpolation mode may be applied to chrominance components but different interpolation modes may be applied to chrominance components Cr and Cb.

The above described embodiments of the present invention can also be implemented through computer readable code/instructions in/on a medium, e.g., a computer readable medium, to control at least one processing element to implement any above described embodiment. The medium can correspond to any medium/media permitting the storing of the computer readable code.

The computer readable code can be recorded or transferred on a medium in a variety of ways, with examples of the medium including recording media, such as magnetic storage media (e.g., ROM, floppy disks, hard disks, etc.) and optical recording media (e.g., CD-ROMs, or DVDs). Thus, the medium may be such a defined and measurable structure such as a device supporting a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention have been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A scalable video encoding method comprising:
   generating a base layer bitstream, and generating a reconstructed image having a second resolution, by encoding an original image having a first resolution into an encoded image having the second resolution; and
   generating an enhancement layer bitstream by reconstructing the reconstructed image having the second resolution, which is received from the first encoding unit, to be a reconstructed image having the first resolution in response to an interpolation mode signal, and then encoding the original image having the first resolution by using the reconstructed image having the first resolution, where the enhancement layer bitstream contains additional information for generating a reconstructed image having the first resolution or a third resolution.

2. The method of claim 1, wherein the interpolation mode signal is determined by considering at least one of a picture type of the original image corresponding to a method used to scan the original image, and a picture type of a reconstructed image at an enhancement layer.

3. The method of claim 1, wherein the generating of an enhancement layer bitstream comprises:
   generating the reconstructed image having the first resolution by extending bit depths of luminance and chrominance components of the reconstructed image having the second resolution while interpolating the chrominance components, in response to the interpolation mode signal;

obtaining residue data having the first resolution by subtracting the reconstructed image having the first resolution from the original image having the first resolution;

obtaining residue data having the third resolution by clipping the residue data having the first resolution;

performing prediction encoding on the residue data having the third resolution; and generating the enhancement layer bitstream including the encoded residue data having the third resolution and the interpolation mode signal.

4. The method of claim 1, wherein the generating of an enhancement layer bitstream comprises:

generating the reconstructed image having the first resolution by interpolating a color component of the reconstructed image having the second resolution, in response to the interpolation mode signal;

obtaining residue data having the first resolution by subtracting the reconstructed image having the first resolution from the original image having the first resolution;

performing prediction encoding on the residue data having the first resolution; and generating the enhancement layer bitstream including the encoded residue data having the first resolution and the interpolation mode signal.

5. An enhancement layer encoding method comprising:

generating a reconstructed image having a first resolution by extending bit depths of luminance and chrominance components of a reconstructed image having a second resolution while interpolating the chrominance components in response to an interpolation mode signal, obtaining residue data having the first resolution by subtracting the reconstructed image having the first resolution from the original image having the first resolution;

obtaining residue data having a third resolution by clipping the residue data having the first resolution;

performing prediction encoding on the residue data having the third resolution; and generating an enhancement layer bitstream including the encoded residue data having the third resolution and the interpolation mode signal.

6. The method of claim 5, wherein the interpolation mode signal is determined by considering at least one of a picture type of the original image corresponding to a method of scanning the original image, and a picture type of a reconstructed image at an enhancement layer.

7. The method of claim 5, wherein, if the original image is obtained through progressive scanning, the reconstructed image having the second resolution is reconstructed to be the reconstructed image having the first resolution based on the interpolation mode signal indicating a frame basis.

8. The method of claim 5, wherein, if the original image is obtained through interlaced scanning, the reconstructed image having the second resolution is reconstructed to be a reconstructed image having the first resolution based on the interpolation mode signal indicating one of a frame and a field basis.

9. The method of claim 5, wherein, if the original image is obtained through progressive scanning and the interpolation mode signal represents an interpolation mode on the frame basis, the reconstructed image that is a frame image having the first resolution is generated using a plurality of pixels adjacent to a pixel that is to be interpolated, which are included in the reconstructed image that is a frame image having the second resolution.

10. The method of claim 5, wherein, if the original image is obtained through interlaced scanning and the interpolation mode signal represents an interpolation mode based on interlaced scanning, the reconstructed image that is a frame image having the first resolution is generated using a plurality of pixels adjacent to a pixel that is to be interpolated, in an even field image and an odd field image obtained from the reconstructed image that is a frame image having the second resolution.

11. The method of claim 5, wherein, if the original image is obtained through interlaced scanning and the interpolation mode signal represents an interpolation mode based on interlaced scanning, a reconstructed image having the first resolution of an even field is generated using a plurality of pixels adjacent to a pixel that is to be interpolated, in a reconstructed image having the second resolution of an even field, and a reconstructed image having the first resolution of an odd field is generated using a plurality of pixels adjacent to a pixel that is to be interpolated, in a reconstructed image having the second resolution of an odd field.

12. A scalable video decoding method comprising:

generating a reconstructed image having a second resolution by decoding a base layer bitstream of a scalable bitstream obtained by encoding an original image having a first resolution; and generating a final reconstructed image having the first resolution by reconstructing the reconstructed image having the second resolution to be an interim reconstructed image having the first resolution, in response to an interpolation mode signal contained in an enhancement layer bitstream of the scalable bitstream, and then decoding the enhancement layer bitstream by using the interim reconstructed image having the first resolution.

13. The method of claim 12, wherein the interpolation mode signal is determined by considering at least one of a picture type of the original image corresponding to a method of scanning the original image and a picture type of a reconstructed image at an enhancement layer.

14. The method of claim 12, wherein the generating of a final reconstructed image having the first resolution comprises:

generating the interim reconstructed image having the first resolution by extending bit depths of luminance and chrominance components of the reconstructed image having the second resolution while interpolating the chrominance components in response to the interpolation mode signal;

reconstructing residue data having a third resolution by performing prediction encoding upon the enhancement layer bitstream;

generating residue data having the first resolution by extending a bit depth of the residue data having the third resolution; and generating the final reconstructed image having the first resolution by combining the interim reconstructed image having the first resolution and the residue data having the first resolution.

15. The method of claim 12, wherein the generating of a final reconstructed image having the first resolution comprises:

generating the interim reconstructed image having the first resolution by interpolating chrominance components of the reconstructed image having the second resolution in response to the interpolation mode signal;

reconstructing residue data having the first resolution by performing prediction encoding upon the enhancement layer bitstream; and generating the final reconstructed image having the first resolution by combining the interim reconstructed image having the first resolution and the residue data having the first resolution.

16. An enhancement layer decoding method comprising:
generating an interim reconstructed image having a first resolution by extending bit depths of luminance and chrominance components of a reconstructed image having a second resolution, which is obtained by decoding a base layer bitstream of a scalable bitstream, while interpolating the chrominance components, in response to an interpolation mode signal contained in an enhancement layer bitstream of the scalable bitstream which is obtained by encoding an original image having the first resolution;
reconstructing residue data having a third resolution by performing prediction encoding upon the enhancement layer bitstream;
generating residue data having the first resolution by extending a bit depth of the residue data having the third resolution; and
generating a final reconstructed image having the first resolution by combining the interim reconstructed image having the first resolution and the residue data having the first resolution.

17. The method of claim 16, wherein, if the original image is obtained through progressive scanning, the reconstructed image having the second resolution is reconstructed to be the interim reconstructed image having the first resolution based on the interpolation mode signal indicating a frame basis.

18. The method of claim 16, wherein, if the original image is obtained through interlaced scanning, the reconstructed image having the second resolution is reconstructed to be the interim reconstructed image having the first resolution, based on the interpolation mode signal indicating a frame or field basis.

19. The method of claim 16, wherein, if the original image is obtained through progressive scanning and the interpolation mode signal indicates an interpolation mode on a frame basis, the interim reconstructed image having the first resolution is generated using a plurality of pixels adjacent to a pixel that is to be interpolated, in the reconstructed image having the second resolution, the interim reconstructed image having the first resolution and the reconstructed image having the second resolution being frame images.

20. The method of claim 16, wherein, if the original image is obtained through interlaced scanning and the interpolation mode signal represents an interpolation mode on a frame basis, the interim reconstructed image having the first resolution is generated using a plurality of pixels adjacent to a pixel that is to be interpolated, in an even pixel and an odd pixel obtained from the reconstructed image having the second resolution, the interim reconstructed image having the first resolution and the reconstructed image having the second resolution being frame images.

21. The method of claim 16, wherein, if the original image is obtained through interlaced scanning and the interpolation mode signal represents an interpolation mode based on a field-type, a reconstructed image having the first resolution of an even field is generated using a plurality of pixels adjacent to a pixel that is to be interpolated, in a reconstructed image having the second resolution of an even field; and a reconstructed image having the first resolution of an odd field is generated using a plurality of pixels adjacent to a pixel that is to be interpolated, in a reconstructed image having the second resolution of an odd field.

22. An enhancement layer decoding method comprising:
generating an interim reconstructed image having a first resolution by interpolating chrominance components of a reconstructed image having a second resolution, which is obtained by decoding a base layer bitstream of a scalable bitstream, in response to an interpolation mode signal contained in an enhancement layer bitstream of the scalable bitstream obtained by encoding an original image having the first resolution;
reconstructing residue data having the first resolution by performing prediction encoding upon the enhancement layer bitstream; and
generating a final reconstructed image having the first resolution by combining the interim reconstructed image having the first resolution and the residue data having the first resolution.

23. At least one non-transitory computer readable medium storing instructions that control at least one processor to implement the method of claim 12.

24. At least one non-transitory computer readable medium storing instructions that control at least one processor to implement the method of claim 16.

25. At least one non-transitory computer readable medium storing instructions that control at least one processor to implement the method of claim 22.

* * * * *